Nov. 6, 1928.
R. J. CLARK
1,690,924
GATE OPERATING MEANS
Filed May 23, 1928    3 Sheets-Sheet 3
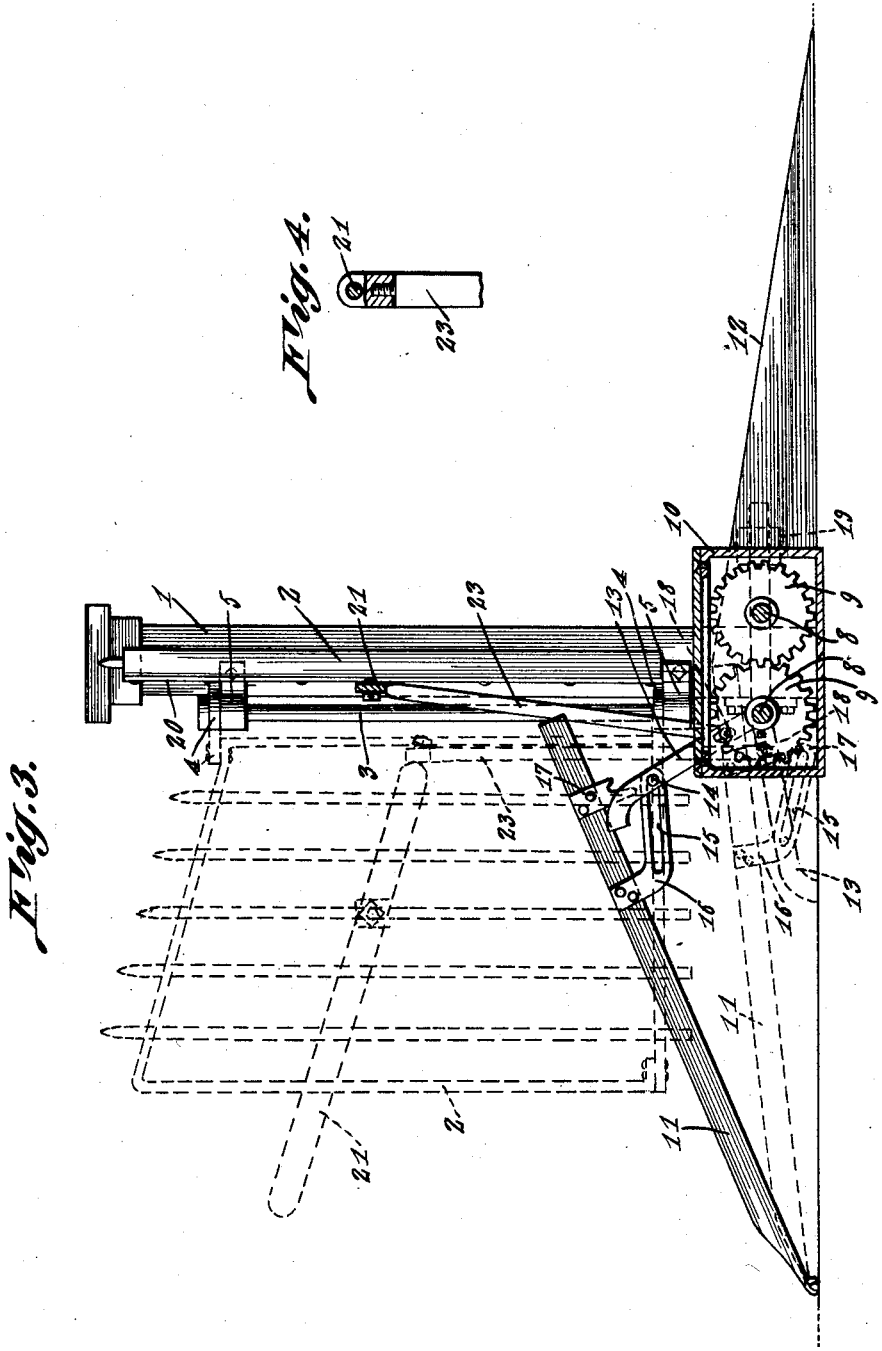
R. J. Clark, INVENTOR
BY Victor J. Evans
ATTORNEY Patented Nov. 6, 1928.

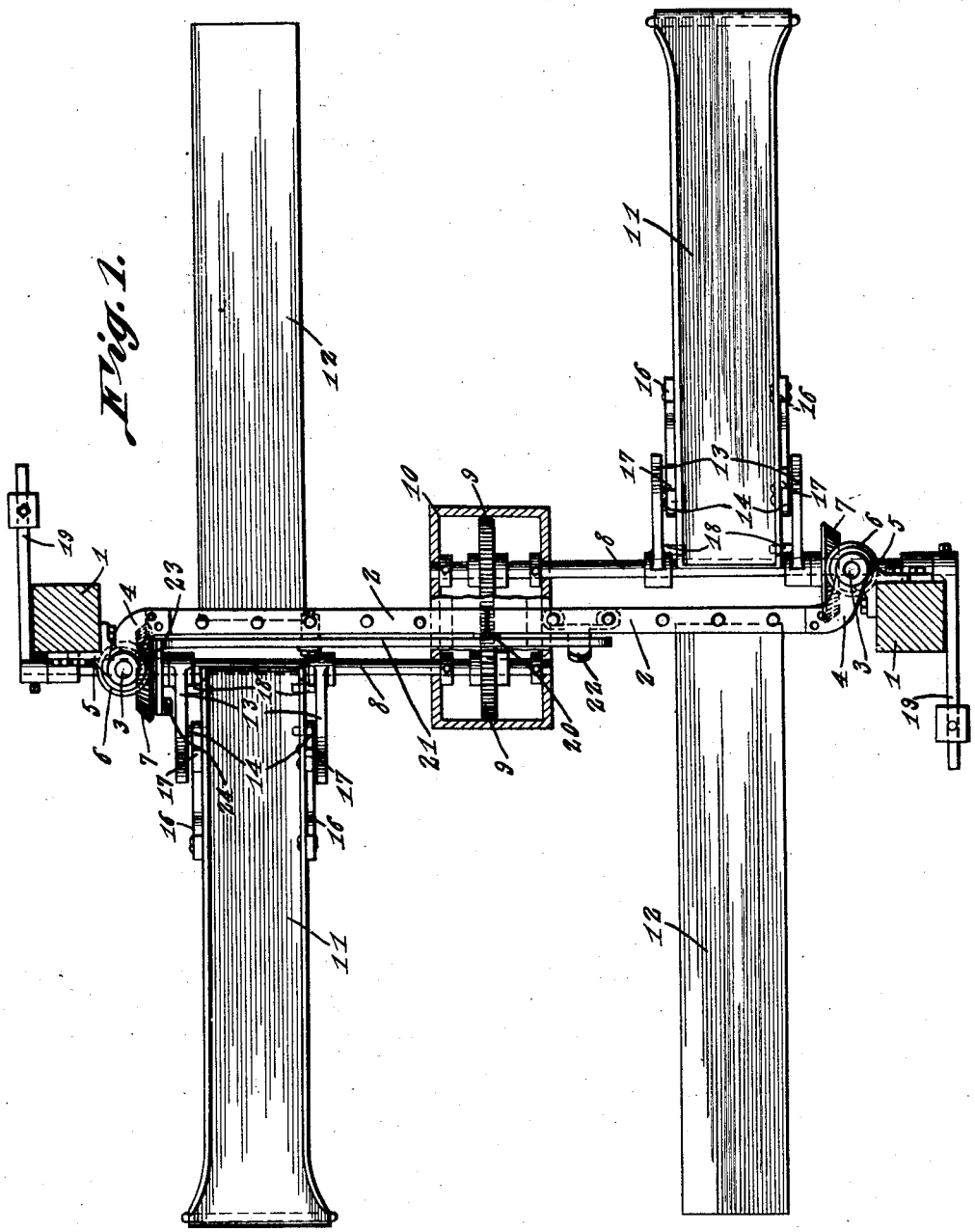

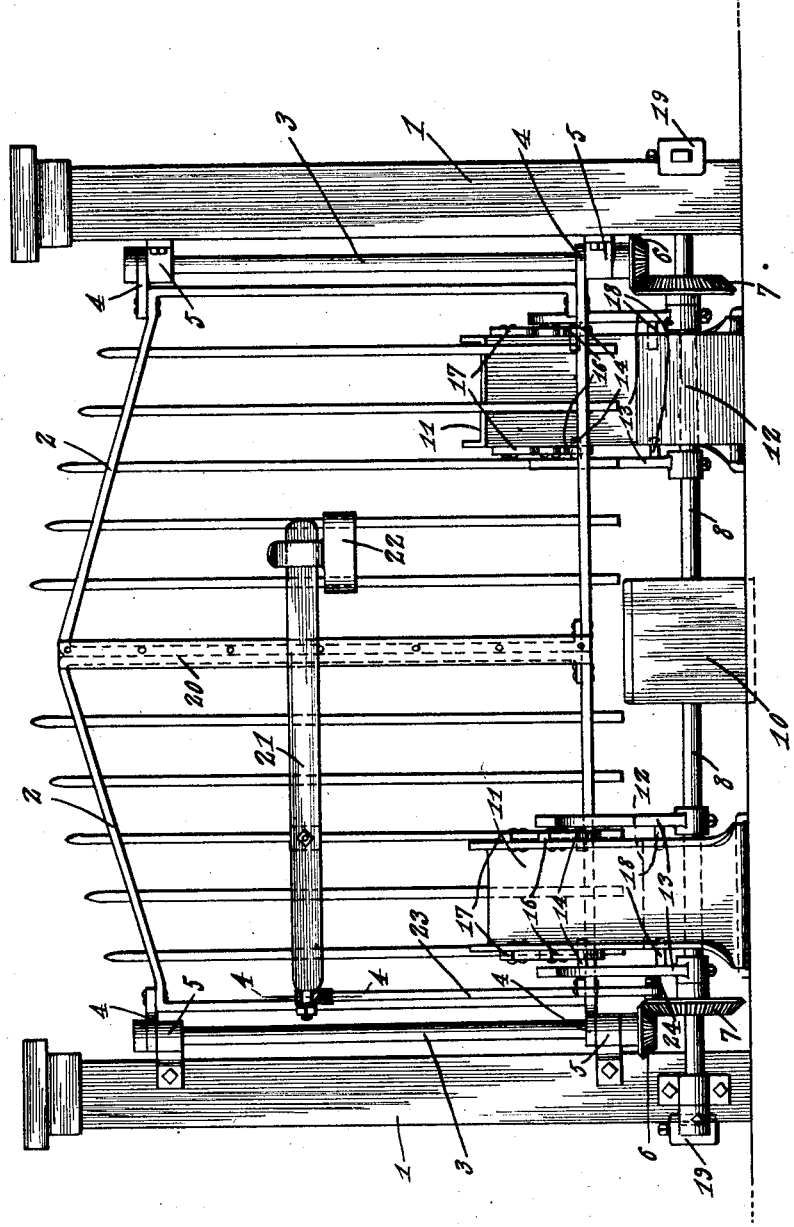

1,690,924

UNITED STATES PATENT OFFICE.

ROBERT J. CLARK, OF WHITMANS, WEST VIRGINIA.

GATE-OPERATING MEANS.

Application filed May 23, 1928. Serial No. 280,060.

This invention relates to automatic means for opening and closing gates, doors and the like, the general object of the invention being to provide an arrangement of shafts and gears for imparting movement to the gates or doors, with members depressed by the wheels of a vehicle for actuating the shafts to open the gates, with weighted means for closing the gates after the wheels leave the members.

Another object of the invention is to provide latch means which are actuated from one of the gears.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is a front view thereof.

Figure 3 is a vertical sectional view showing the parts in full lines with the gates closed and in dotted lines with the gates open.

Figure 4 is a section on line 4—4 of Figure 2.

In these views, the numerals 1 indicate the gate posts and 2 the gates which are hingedly connected with the posts by the vertically arranged shafts 3 which pass through the hinge parts 4 on the gates and the bearing members 5 on the posts. The lower end of each shaft has attached thereto a bevel gear 6 which meshes with the bevel gear 7 on the outer end of a horizontally arranged shaft 8, the two shafts 8 being connected together by the gears 9, the inner ends of the shafts 8 and the gears being enclosed in a casing 10.

A channel member 11 is placed at each side of the gate and the channel members are arranged at opposite sides of the road so that one member will be engaged by some of the wheels of a vehicle approaching the gate from one direction and the other member will be engaged by some of the wheels of a vehicle approaching the gate in an opposite direction. The other wheels of the vehicle engage the inclined runways 12 placed at opposite sides of the road, one on each side of the gate, these runways being in alignment with the members 11 so that the wheels of a vehicle will pass from the member 11 on to a runway 12 or vice versa.

A pair of arms 13 is fastened to each shaft 8 and each arm carries a pin 14 which engages a slot 15 formed in the horizontal part of a curved arm 16 which is fastened to each side of each member 11. Each member 11 has attached thereto a pair of depending parts 17, one arranged at each side of the member and the lower ends of these parts are forked to engage the pins 18 of the arms after the members 11 have been moved downwardly to a certain extent under the weight of the vehicle.

Thus it will be seen that when a vehicle approaches the gate, the wheels on one side thereof will engage the member 11 and the wheels on the opposite side will engage the runway 12. As the weight of the vehicle comes upon the member 11, said member will be moved downwardly and this movement will be imparted to the arms 13, the pins 14 of which are engaged by the arms 16 of said member 11 and as said arms 13 are connected with the shaft 8 on that side of the gate which the vehicle is approaching, said shaft will be turned and this movement of this shaft will be communicated to the hinged shaft 3 which is geared to said shaft 8 by the gears 6 and 7 and this movement of the shaft 8 will also be communicated to the other shaft 8 by the gears 9, so that the gates will start to swing open, the gates moving in opposite directions. This movement of the second shaft 8 will be communicated to the member 11 which is connected therewith so that said member will be lowered so that the wheels of the vehicle can pass from the runway 12 upon said member 11. As the member 11 which is engaged by the wheels of the vehicle continues to move downwardly, the forked member 17 will engage the pins 18 of the arms 13, which then take the weight from the arms 16 and continue to force the arms 13 downwardly until their curved ends rest upon the ground, as shown in dotted lines in Figure 3. The parts will then have moved to a position where the gates are fully open. As the vehicle passes through the gateway, the wheels on one side thereof will engage the other member 11 which has been lowered as before described, and the wheels on the other side of the vehicle will engage the second runway 12 so that the vehicle will pass through the gateway and upon the road on the opposite side thereof. The parts are then returned to normal position and the gates closed by the weighted arms 19 which are connected with the ends of the shafts 8 so that the gates will be closed and the members 11 raised ready for the next vehicle. A strip 20 is connected with one gate and is engaged by the other gate when the gates are closed so that this strip acts to limit the swinging movement of the gates.

A latch bar 21 is pivoted to one gate and is adapted to engage a keeper member 22 carried by the other gate. The outer end of the latch bar is pivotally connected with a pitman 23 which has its lower end connected to a crank pin 24 on one of the gears 7 so that when the shaft 8 which carries said gear 7 starts to rotate, the pitman is caused to swing the latch bar on its pivot and thus move it out of the keeper member so as to unlatch the gates and permit them to swing open under the action of their operating parts. Thus I provide simple means for causing the opening of the gates by a vehicle approaching the gates and while the drawings show the invention applied to gates, it will, of course, be understood that it may be used for doors and the like.

It is thought from the foregoing description that the advantages and novel features of my invention will be readily apparent.

It is to be understood that I may make changes in the costruction and in the combination and arrangement of the several parts, provided that such changes fall within the scope of the appended claims.

What I claim is:—

1. In combination with a pair of hinged barriers, a pair of horizontally arranged shafts, gears connecting the shafts with the hinged parts of the barriers for turning the barriers on the hinges when the shafts are turned, gears connecting the two shafts together, an arm on each shaft, a channel member arranged on each side of the barriers, one member being arranged at one side of the road and the other on the opposite side thereof, a slotted arm connected with each channel member, a pin in each of the first mentioned arms engaging the slot in each second arm whereby, when a vehicle passes over each channel member, the slotted arms, engaging the pin on the first arm, will cause said first arm to rock the shaft to open the gates and lower the other channel member.

2. In combination with a pair of hinged barriers, a pair of horizontally arranged shafts, gears connecting the shafts with the hinged parts of the barriers for turning the barriers on the hinges when the shafts are turned, gears connecting the two shafts together, an arm on each shaft, a channel member arranged on each side of the barriers, one member being arranged at one side of the road and the other on the opposite side thereof, a slotted arm connected with each channel member, a pin in each of the first mentioned arms engaging the slot in each second arm whereby, when a vehicle passes over each channel member, the slotted arms, engaging the pin on the first arm, will cause said first arm to rock the shaft to open the gates and lower the other channel member, a second pin on the first arm and a depending part on each channel member for engaging said second pin, after the channel member has been moved downwardly to a certain extent, to complete the lowering movement of the first arm and the opening movement of the barriers.

3. In combination with a pair of hinged barriers, a pair of horizontally arranged shafts, gears connecting the shafts with the hinged parts of the barriers for turning the barriers on the hinges when the shafts are turned, fears connecting the two shafts together, an arm on each shaft, a channel member arranged on each side of the barriers, one member being arranged at one side of the road and the other on the opposite side thereof, a slotted arm connected with each channel member, a pin in each of the first mentioned arms engaging the slot in each second arm whereby, when a vehicle passes over each channel member, the slotted arms, engaging the pin on the first arm, will cause said first arm to rock the shaft to open the gates and lower the other channel member, a second pin on the first arm and a depending part on each channel member for engaging said second pin, after the channel member has been moved downwardly to a certain extent, to complete the lowering movement of the first arm and the opening movement of the barriers and a weighted arm on each shaft for normally holding the parts in a position with the barriers closed.

4. In combination with a pair of hinged barriers, a pair of horizontally arranged shafts, gears connecting the shafts with the hinged parts of the barriers for turning the barriers on the hinges when the shafts are turned, gears connecting the two shafts together, an arm on each shaft, a channel member arranged on each side of the barriers, one member being arranged at one side of the road and the other on the opposite side thereof, a slotted arm connected with each channel member, a pin in each of the first mentioned arms engaging the slot in each second arm whereby, when a vehicle passes over each channel member, the slotted arms, engaging the pin on the first arm, will cause said first arm to rock the shaft to open the gates and lower the other channel member, a second pin on the first arm, a depending part on each channel member for engaging said second pin, after the channel member has been moved downwardly to a certain extent, to complete the lowering movement of the first arm and the opening movement of the barriers, a weighted arm on each shaft for normally holding the parts in a position with the barriers closed and latch means automatically moved to releasing position by the rotary movement of one of the shafts.

In testimony whereof, I affix my signature.

ROBERT J. CLARK.